United States Patent [19]
Ikeda

[11] Patent Number: 5,904,215
[45] Date of Patent: May 18, 1999

[54] AUTOMATIC BRAKE CONTROL SYSTEM AND THE METHOD THEREOF

[75] Inventor: Atsushi Ikeda, Ashikaga, Japan

[73] Assignee: Fuji Jukogyo Kabushiki Kaisha, Tokyo, Japan

[21] Appl. No.: 08/700,731

[22] Filed: Aug. 15, 1996

[30] Foreign Application Priority Data

Sep. 14, 1995 [JP] Japan ................................. 7-236934

[51] Int. Cl.⁶ ........................................................ B60T 7/16
[52] U.S. Cl. ........................... 180/169; 180/170; 303/155; 701/93; 701/301
[58] Field of Search .................................. 180/167, 168, 180/169, 170, 176, 177, 178, 179; 303/113.4, 155, 193; 701/93, 301

[56] References Cited

U.S. PATENT DOCUMENTS

| | | | |
|---|---|---|---|
| 5,165,497 | 11/1992 | Chi ........................................... | 180/169 |
| 5,189,619 | 2/1993 | Adachi et al. ............................ | 180/170 |
| 5,197,562 | 3/1993 | Kakinami et al. ....................... | 180/169 |
| 5,278,764 | 1/1994 | Iizuka et al. ............................. | 180/170 |
| 5,357,438 | 10/1994 | Davidian .................................. | 180/169 |
| 5,420,792 | 5/1995 | Butsuen et al. .......................... | 180/169 |
| 5,574,644 | 11/1996 | Butsuen et al. .......................... | 180/169 |
| 5,642,093 | 6/1997 | Kinoshita et al. ....................... | 180/167 |
| 5,659,304 | 8/1997 | Chakraborty ............................. | 180/167 |

FOREIGN PATENT DOCUMENTS

| | | |
|---|---|---|
| 4138970 | 5/1992 | Japan . |
| 5305839 | 11/1993 | Japan . |
| 6286630 | 10/1994 | Japan . |

*Primary Examiner*—Robert J. Oberleitner
*Assistant Examiner*—Pamela J. Lipka
*Attorney, Agent, or Firm*—Martin A. Farber

[57] ABSTRACT

An automatic brake control system brakes a driving vehicle according to a target brake control amount calculated by a neural network. The system detects vehicle speed of the driving vehicle, and detects the actual distance between the driving vehicle and a vehicle ahead of the driving vehicle. The system calculates a reference distance defined as a physically preferred distance between the driving vehicle and the vehicle ahead of the driving vehicle according to the vehicle speed, and normalizes the actual distance with the reference distance in order to obtain a normalized distance in a dimensionless quantity. The neural network calculates target brake control amount according to the vehicle speed and the normalized distance, and the automatic brake control system brakes the driving vehicle according to the target brake control amount.

13 Claims, 6 Drawing Sheets

AUTOMATIC BRAKE CONTROL SYSTEM AND THE METHOD THEREOF

BACKGROUND OF THE INVENTION

1. Field of the Invention

The present invention relates to an automatic brake control system and a method thereof and more particularly to an automatic brake control system having a learning capability employing neural networks and the method thereof.

2. Prior Arts

As an example of known automatic brake control systems, Japanese Unexamined Patent Application Toku-Kai-Hei 5-305839 discloses a technique in which engine power and brake force of a vehicle are automatically controlled based on its vehicle speed, acceleration, deceleration and distances between the vehicle and another vehicle running ahead. Further, as an example of technique introducing a neural network into automobiles, Japanese Unexamined Patent Application Toku-Kai-Hei 4-138970 proposes a rear wheel steering system in which a yaw rate and other control parameters are estimated by a neural network learned by the back-propagation method and a target steering angle of the rear wheel is determined based on these estimated control parameters. Furthermore, Japanese Unexamined Patent Application Toku-Kai-Hei 6-286630 discloses a technique in which a road friction coefficient is estimated from a vehicle speed and other parameters by employing the neural network.

It can be considered that the neural network is applied to the estimation of control parameters of the vehicle for determining a target amount of brake control. However, it is insufficient to apply the neural network only for estimating the control parameters of the vehicle. The automatic brake control system is dependent on not only the vehicle characteristics but also human factors such as a driver's driving habits. More specifically, for example, the timing or the way of pressing a brake pedal differs from person to person. Some drivers press the brake pedal rather early but the way of depression is moderate and some drivers press the brake pedal rather late but the way of depression is aggressive.

Consequently, it is impossible to realize an automatic brake control system which is preferable to every driver as far as a target brake control amount is determined based on the vehicle parameters only. The automatic brake control is operated too slowly for a driver having a habit of applying brake rather early and it is operated too fast for a driver having a habit of applying brake rather late. Further, since some drivers may feel awkwardness depending upon the transient condition of the vehicle during pressing of the brake pedal, only correcting parameters of a given calculation formula brings an insufficient result.

Therefore, it is more important to apply the neural network directly to the calculation itself of the target brake control amount than to the estimation of vehicle parameters. Namely, the automatic brake control can be provided with a greater flexibility and a higher adaptability by introducing a learning function into calculating means for calculating the target brake control amount.

However, in applying the neural network to the calculation of the target brake control amount, using a small size of network for the calculation without taking any measures leads to an insufficient accuracy of the result of the calculation. Further, there are difficulties in ensuring the compatibility of the control with the learning or in how to select learning contents properly.

SUMMARY OF THE INVENTION

Accordingly, the present invention is intended to obviate the aforementioned problems and disadvantages of the prior arts and it is an object of the present invention to provide a safe automatic brake control system introducing human factors such as a driver's sensitivity, driving habits as well as vehicle characteristics.

Further, it is another object of the present invention to provide an automatic brake control system having a learning capability and besides having a capability of controlling in parallel with learning.

In order to achieve these objects, the automatic brake control system according to the present invention comprises:

reference vehicle-to-vehicle distance calculating means for calculating a reference distance between a vehicle and another vehicle according to a formula parameterizing a vehicle speed;

normalized vehicle-to-vehicle distance calculating means for calculating a normalized distance between the vehicle and the other vehicle according to a normalization formula parameterizing a ratio of the normalized distance and the reference distance;

first memory means for memorizing a driver's data including the vehicle speed, the normalized distance between the vehicle and the other vehicle and the depression amount at least while the foot brake pedal is depressed by a driver during a normal operation of the vehicle;

second memory means for memorizing a standard data including the vehicle speed, the normalized distance between the vehicle and the other vehicle and the depression amount of the brake pedal;

output controlling means for outputting the driver's data and the standard data when the driver finishes depressing the brake pedal;

selecting signal generating means for generating a selection signal when the ignition switch is turned on;

neural network selecting means responsive to the selection signal for selecting at least one neural network for control use and for selecting at least one rest neural network for learning use;

controlling and learning means with respect to the neural network selected for learning use for learning the driver's data and the standard data based on the vehicle speed and the normalized distance between the vehicle and the other vehicle and for producing a learned data, and concurrently with respect to the neural network selected for control use for calculating and selectively outputting a target brake control amount based on the vehicle speed and the normalized distance between the vehicle and the other vehicle with reference to the learned data; and output switching means responsive to the selection signal for selecting the target brake control amount calculated by the neural network selected for control use and for outputting the target brake control amount to the automatic brake apparatus.

DETAILED DESCRIPTION OF THE PREFERRED EMBODIMENTS

Figure 5:
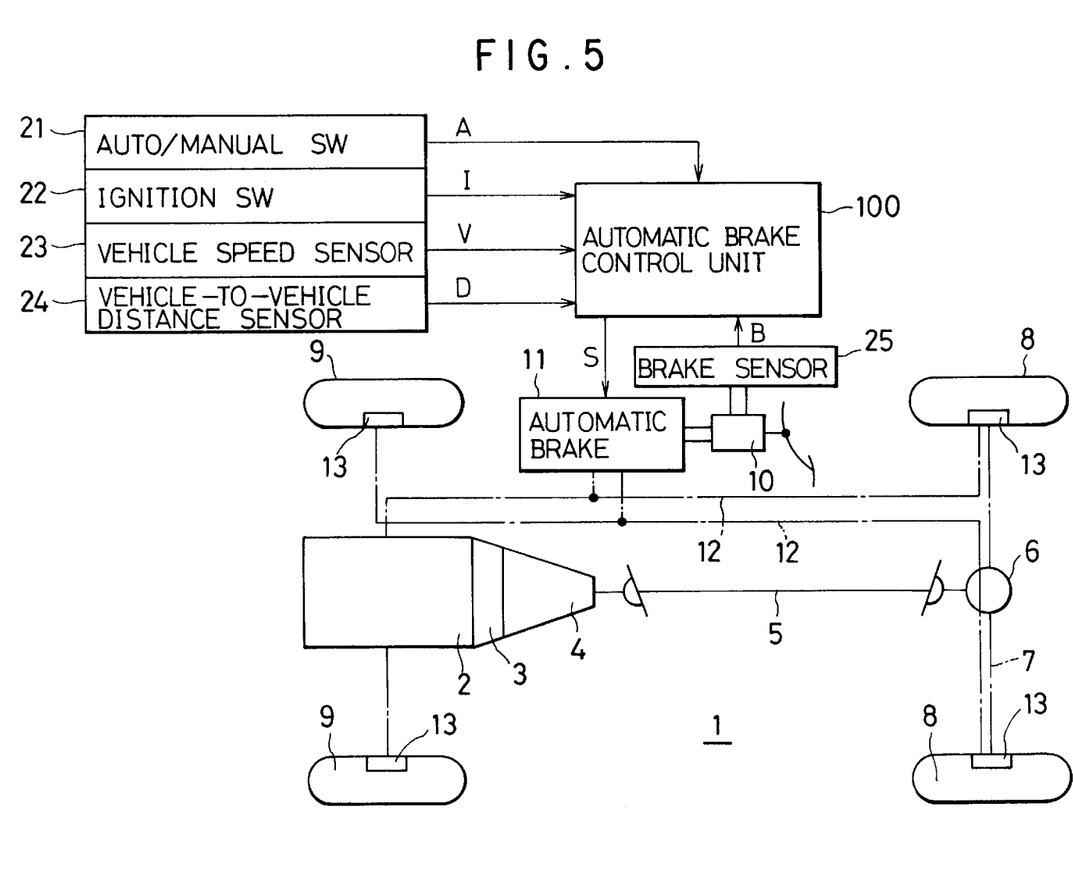
FIG. 5 is a schematic diagram of a vehicle incorporating an automatic brake control system according to the present invention.

Referring now to FIG. 5, numeral 1 denotes a four-wheel vehicle driven by rear wheels, in which an output shaft of an engine 2 is connected with a transmission 4 through a clutch 3 and further an output shaft of the transmission 4 is connected with a propeller shaft 5, a rear differential 6, a rear axle 7 and rear wheels 8 in this order so as to transmit a rotational output of the engine 2 to the rear wheels 8. Further, front wheels 9 are steered through a steering system (not shown).

The vehicle includes a foot brake 10 for generating braking pressure by depressing a brake pedal, an automatic brake control unit 100, an automatic brake 11 for generating brake pressure according to the target brake control amount S which is sent from the automatic brake control unit 100 and four sets of brake units 13 for applying braking force to the front wheels 8 and the rear wheels 9 based on brake pressures transmitted from the foot brake 10 and the automatic brake 11 through brake pipes 12. Thus, the brake system according to this embodiment applies brakes to the vehicle not only through the foot brake 10 but also through the automatic brake 11.

The automatic brake control unit 100 is composed of an electronic circuit in which a target amount of brake control S is determined based on vehicle parameters like a vehicle speed V, comprising a major component of the automatic brake control system. Further, the vehicle 1 includes an auto/manual switch 21 for outputting a mode signal A, i.e., an ON-signal when the automatic brake control is selected and an OFF-signal when the automatic brake control is not selected, an ignition switch 22 for outputting an operation signal I, i.e., an ON-signal when the engine is started and an OFF-signal when the engine is shut down, a vehicle speed sensor 23 for detecting and outputting a vehicle speed V of the vehicle 1, a vehicle-to-vehicle distance sensor 24 for detecting and outputting a vehicle-to-vehicle distance D between the vehicle 1 and a vehicle running ahead of the vehicle 1 by image recognition and the like, and a brake sensor 25 for detecting and outputting a depression amount B of the foot brake 10.

Figure 1:
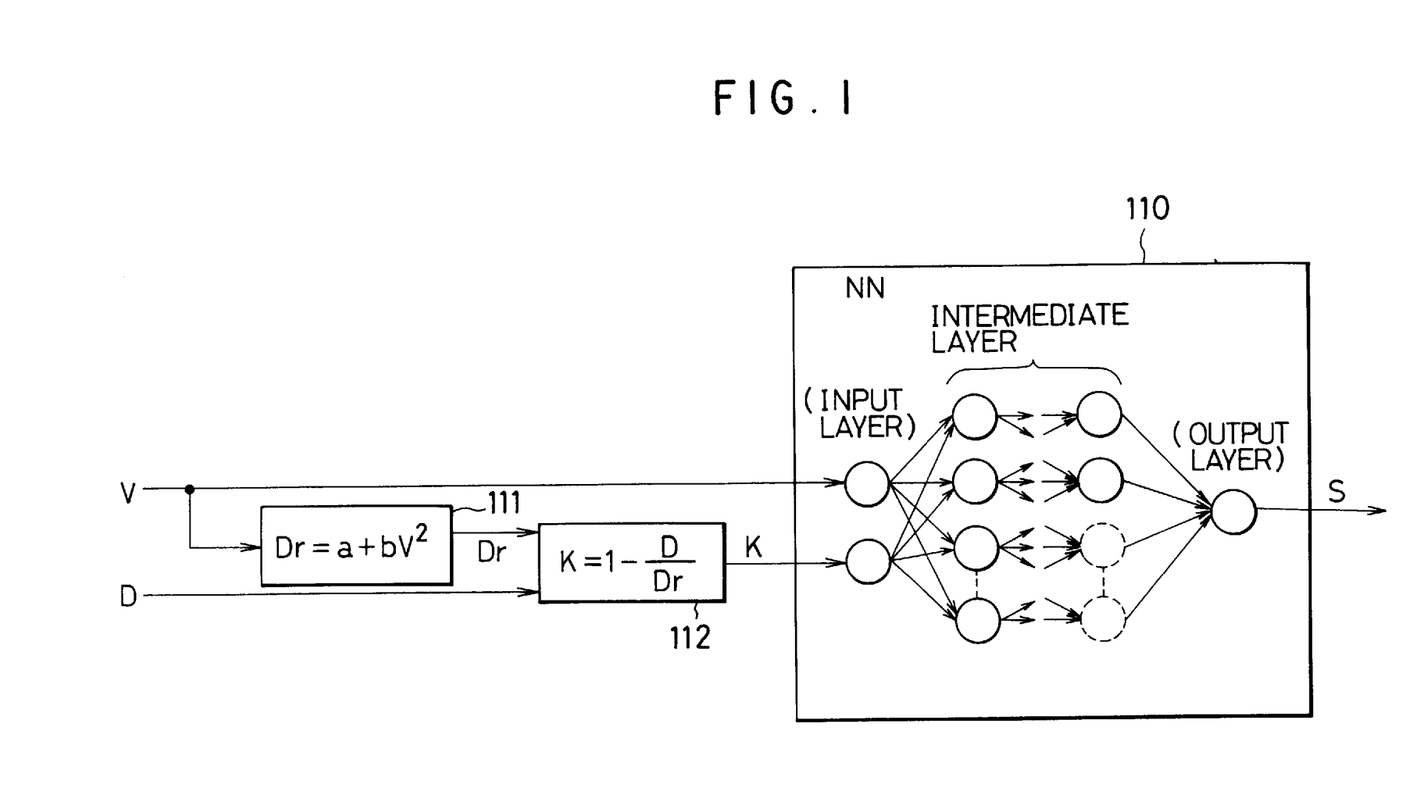
FIG. 1 is a block diagram showing a function for normalizing a vehicle-to-vehicle distance in an automatic brake control system according to the present invention.
Figure 2:
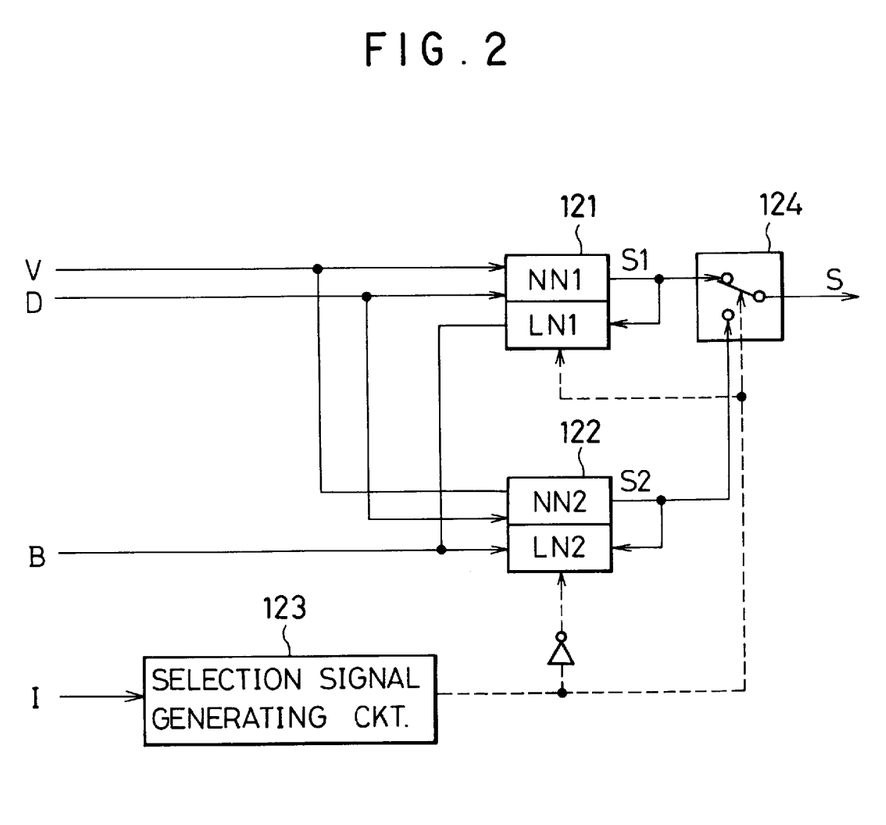
FIG. 2 is a block diagram showing a function for simultaneously executing a control and a learning in an automatic brake control system according to the present invention.
Figure 3:
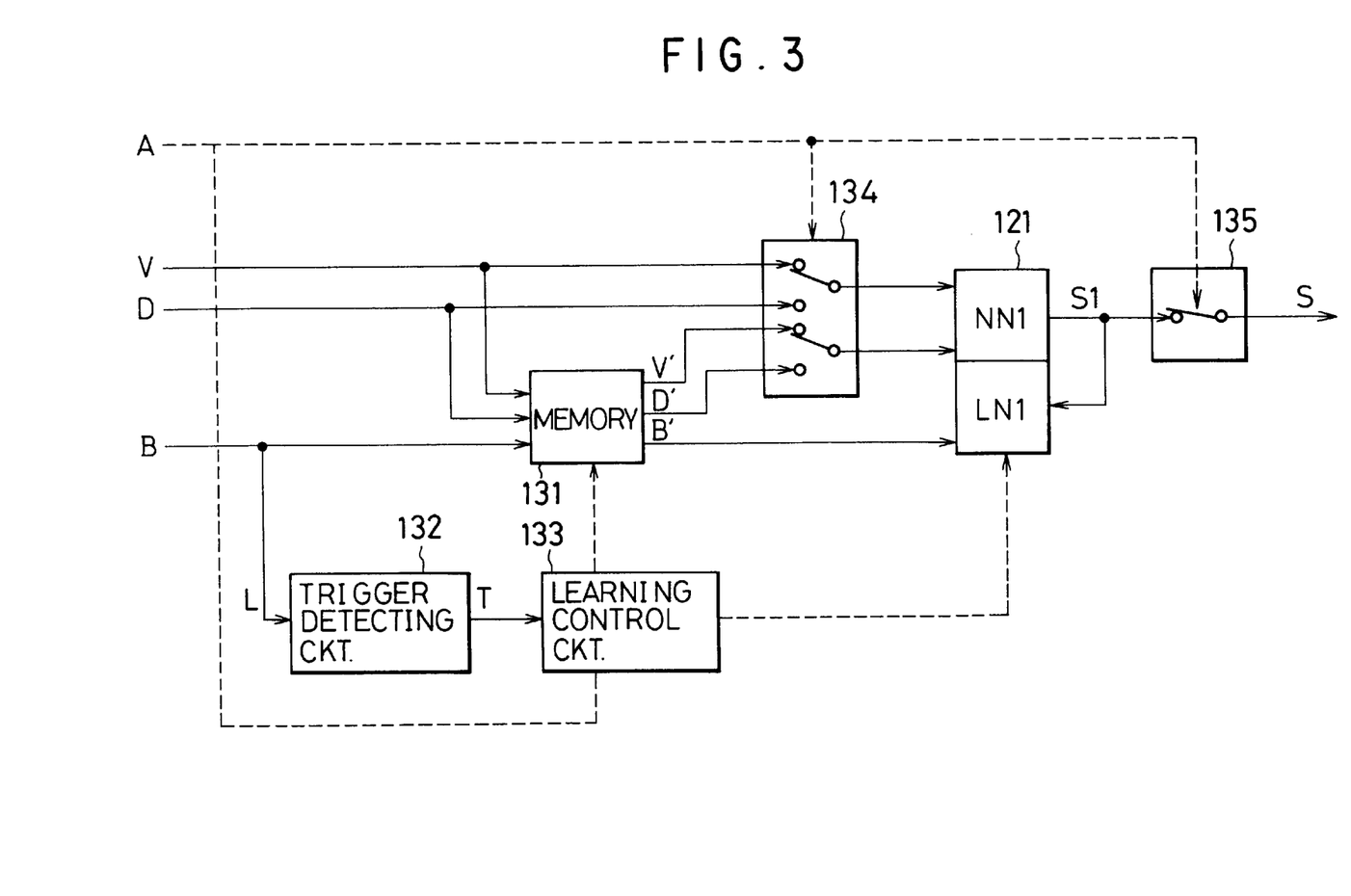
FIG. 3 is a block diagram showing a function for selectively learning data when a braking operation is done in an automatic brake control system according to the present invention.
Figure 4:
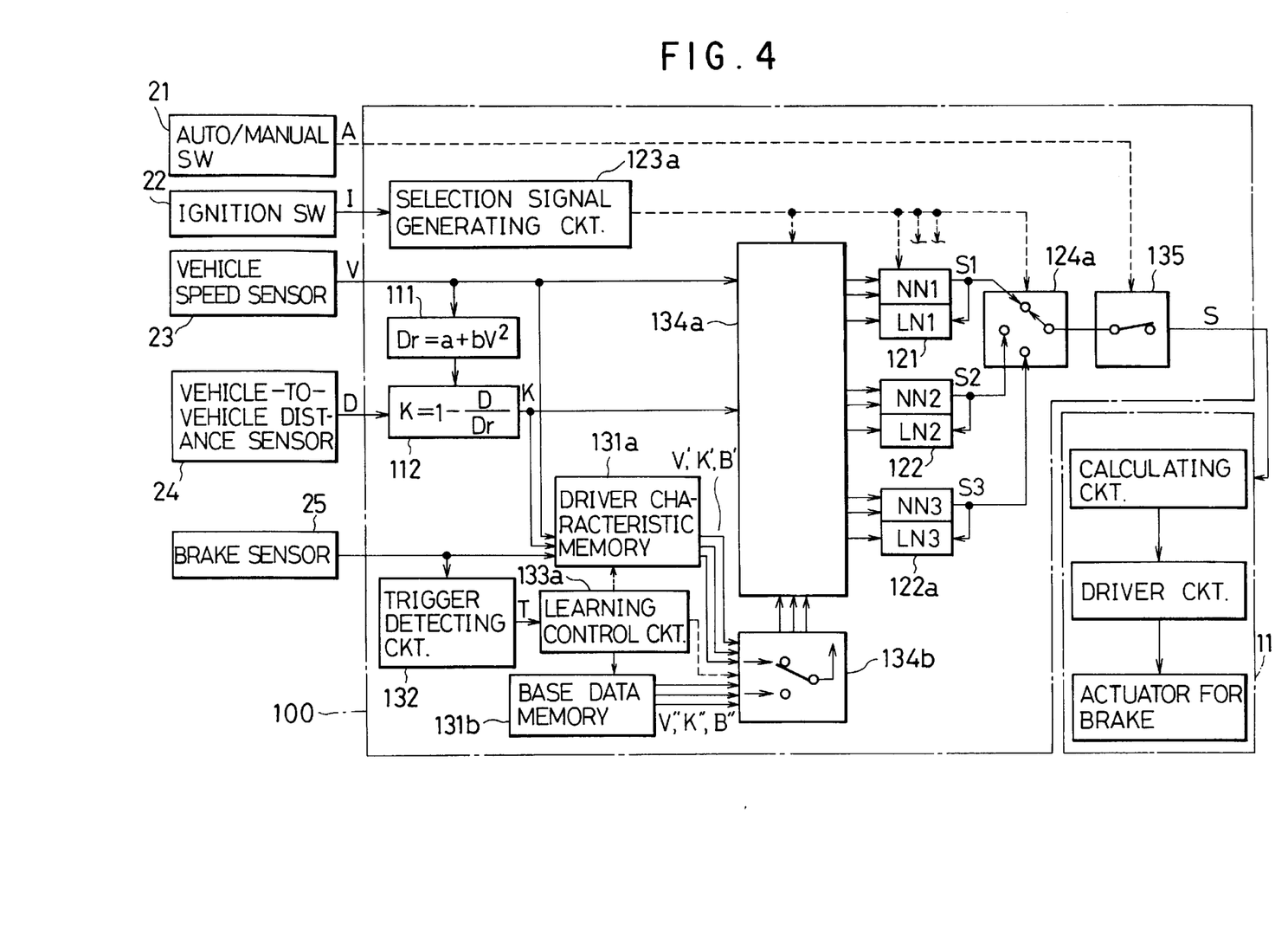
FIG. 4 is a block diagram of an embodiment of an automatic brake control system applied to a vehicle.

FIG. 4 shows a construction of the automatic brake control unit 100. The control unit 100 is for calculating a target amount of brake control by employing neural networks. It comprises a plurality of neural networks 121, 122, 122a having a learning function, means 111, 112 for obtaining a reference vehicle-to-vehicle distance Dr which is a physically preferable distance between the vehicle 1 and the vehicle running ahead based on the vehicle speed V and other parameters, and for obtaining a normalized vehicle-to-vehicle distance K according to a normalization formula from the vehicle-to-vehicle distance D and the reference vehicle-to-vehicle distance Dr, memory means 131a, 131b for memorizing miscellaneous data when brakes are applied, means 123a, 124a for selecting either one from the plurality of neural networks 121, 122, 122a for the purpose of controlling and for leaving the rest of them alone for the purpose of learning, learning/controlling means 133a for calculating the target brake control amount S in the neural network selected for controlling based on the normalized vehicle-to-vehicle distance K and for conducting learning in the rest ones based on the data derived from the memory means 131a, 131b, and input switching means 134a, 134b for switching input data from the memory means 131a, 131b.

Next, the functions of the automatic brake control unit 100 will be described with reference to FIG. 4.

The calculating circuit 111 (referred to as "circuit" but not means for convenience of explanation) calculates the reference vehicle-to-vehicle distance Dr based on the vehicle speed V in accordance with the formula [Dr=a+b V2] and outputs this reference vehicle-to-vehicle distance Dr to the calculating circuit 112. In this formula, a is a constant determined taking a response speed of average drivers and the like into consideration and b is a constant determined taking a brake distance of the vehicle 1 and the like into consideration.

The calculating circuit 112 calculates the normalized vehicle-to-vehicle distance K based on the vehicle-to-vehicle distance D and the reference vehicle-to-vehicle distance Dr according to the normalized formula [K=1−(D/Dr)]. Namely, the calculating circuit 112 has a function as a calculating means for normalizing the vehicle-to-vehicle distance in nondimensional quantity. Inherently, neural networks are not skillful in calculations and consequently it is desirable to avoid charging burdens on neural networks with respect to calculations therein. These processings of vehicle parameters save burdens of calculations in the neural networks. As a result, the neural networks in this embodiment can be very useful with a small scale of network.

The neural network 121 comprises a section NN1 where calculations are carried out according to a neuron model and a section LN1 where learnings are carried out according to a backpropagation method. That is to say, the neural network 121 has a learning function. The neuron model section NN1 calculates an output value according to a sigmoid function [1/(1+exp (−(ΣWij×Xj−h)))], where Xj is an input signal, Wij is a degree of combination between neurons and h is a threshold value. Thus, the neural network can obtain a value between "0" and "1". Other neural networks 122 and 122a have exactly the same construction as the neural network 121.

For the neural networks 121, 122 and 122a, respectively, the neuron model sections NN1, NN2 and NN3 input the vehicle speed (either of V, V' and V") and the normalized vehicle-to-vehicle distance (either of K, K' and K") and output S1, S2 and S3 which correspond to the target brake control amount S, respectively. When selected for learning use, the learning sections LN1, LN2 and LN3 correct a degree of combination between neurons Wij in such a way that the difference between the amount of depression (either of B, B' and B") and the outputs S1, S2 and S3 become zero.

The selection signal generating circuit 123a is a counter circuit for outputting a count value as a selection signal in response to the operation signal I derived from the ignition switch 22. The counter circuit is constituted by a ternary scale in conjunction with three pieces of neural networks. Each time the engine 1 is started and the operation signal I is shifted from OFF to ON, the count value is updated. Then, the count value acts as a selection means for selecting one neural network in order among the neural networks 121, 122, 122a for the control purpose. FIG. 4 indicates a state that the neural network 121 is selected for the control purpose and other two neural networks 122, 122a are employed for the learning purpose and thus controlling and learning are executed simultaneously.

The switching circuit 124a is a selector to which the outputs S1, S2 and S3 of the neural networks 121, 122, 122a are inputted and from which the neural network 121 (in an example of FIG. 4, the neural network 121 is selected) which has been selected for the control purpose outputs to the switching circuit 135 in response to the selection signal from the selection signal generating circuit 123a.

The switching circuit 135 is interposed between the switching circuit 124a and the automatic brake 11. When the mode signal A indicating that the automatic brake control mode is selected is inputted thereto from the auto/manual switch 21, the switching circuit 135 is turned on and when the mode signal A indicating that the automatic brake control mode is released is inputted thereto from the auto/manual switch 21, the switching circuit 135 is turned off. By this switching operation, only when the automatic brake control mode is selected, the output S1 of the neural network 121 is outputted as a target brake control value S to the automatic brake 11 and otherwise the output of the target brake control value S is stopped.

The driver characteristic memory 131a is a RAM used as a ring-buffer. When the driver characteristic memory 131a is controlled in a writing state by the learning control circuit 133a in response to the vehicle speed V and the brake depression amount B, these data are memorized by this memory in time series. After the last area is filled with the last data, the next data and after are returned to the head area and started to be memorized therefrom again. When the driver characteristic memory 131a is controlled in a reading state, the memorized vehicle data, vehicle speed V', normalized vehicle-to-vehicle distance K' and brake depression amount B' are read out and outputted in the same order as when they are memorized.

The base data memory 131b is a ROM into which a series of combinations of a vehicle speed V", a normalized vehicle-to-vehicle distance K" and a brake depression amount B" are memorized. This series of combinations of brake data V", K" and B" have been obtained beforehand through experiments or the like when brakes are applied according to a safe braking guide and the like. Immediately after the series of the data V', K' and B' are finished to be read out from the driver characteristic memory 131a, the base data memory 131b is controlled in a reading state by the learning control circuit 133a and this series of memorized data, vehicle speed V", normalized vehicle-to-vehicle distance K" and brake depression amount B" are read out and outputted in the same order as they are memorized.

The trigger detecting circuit 132 is composed of a comparator for judging whether or not the brake depression amount B is zero, a pulse generator circuit for outputting a trigger pulse in response to the brake depression signal, and the like. That is to say, the trigger detecting circuit 132 has a function to detect a start timing and an end timing of the brake depression and its output, a trigger signal T is sent to the learning control circuit 133a.

The learning control circuit 133a which is mainly constituted by theoretical circuits has a function as learning control means. In response to the trigger signal from the trigger detecting circuit 132, the learning control circuit 133a outputs a control signal to the driver characteristic memory 131a, the base data memory 131b, the distributor 134b and the neural networks selected for learning.

Specifically, when an end of the brake depression is detected by the trigger signal T, the learning control circuit 133a changes over the driver characteristic memory 131a from a writing condition to a reading condition and instructs to output the series of data, vehicle speed V', normalized vehicle-to-vehicle distance K' and brake depression amount B' which has been memorized immediately before. Then, the learning control circuit 133a instructs the base data memory 131b so as to output the series of data, vehicle speed V", normalized vehicle-to-vehicle distance K" and brake depression amount B" in order to make the neural networks 122 and 122a selected for learning perform a learning operation.

Reading out from the driver characteristic memory 131a is started with the data memorized a very small time Δt before the start timing of the brake depression. This is for latching an address of the memory 131a when data is memorized at the start of brake depression, or raising a flag at the address so as to find a clue. During the reading out of data, all the data associated with the braking operation from the start to the end of brake depression are read out. Data not associated with an actual braking operation is removed from the learning subject.

The distributor 134b is a selector based on the control of the learning control circuit 133a for selecting either the data combination of the vehicle speed V', the normalized vehicle-to-vehicle distance K' and the brake depression amount B' derived from the driver characteristic memory 131a or the data combination of the vehicle speed V", the normalized vehicle-to-vehicle distance K" and the brake depression amount B" derived from the base data memory 131b. While the data reading from the driver characteristic memory 131a is being conducted, the data combination of the vehicle speed V', the normalized vehicle-to-vehicle distance K' and the brake depression amount B' is sent to the input switching circuit 134a. Similarly, while the data reading from the base data memory 131b is conducted, the data combination of the vehicle speed V", the normalized vehicle-to-vehicle distance K" and the brake depression B" is sent to the input switching circuit 134a.

The input switching circuit 134a is a group of selectors according to the selection signal from the selection signal generating circuit 123a for selectively sending the combination of the vehicle speed V from the vehicle speed sensor 23 and the normalized vehicle-to-vehicle distance K to the neural network 121 selected for controlling, and the combinations of the vehicle speed V, the normalized vehicle-to-vehicle distance K and the brake depression amount B to the neural networks 122, 122a selected for learning. Namely, this circuit has a function as a switching means of input data.

Figure 6:
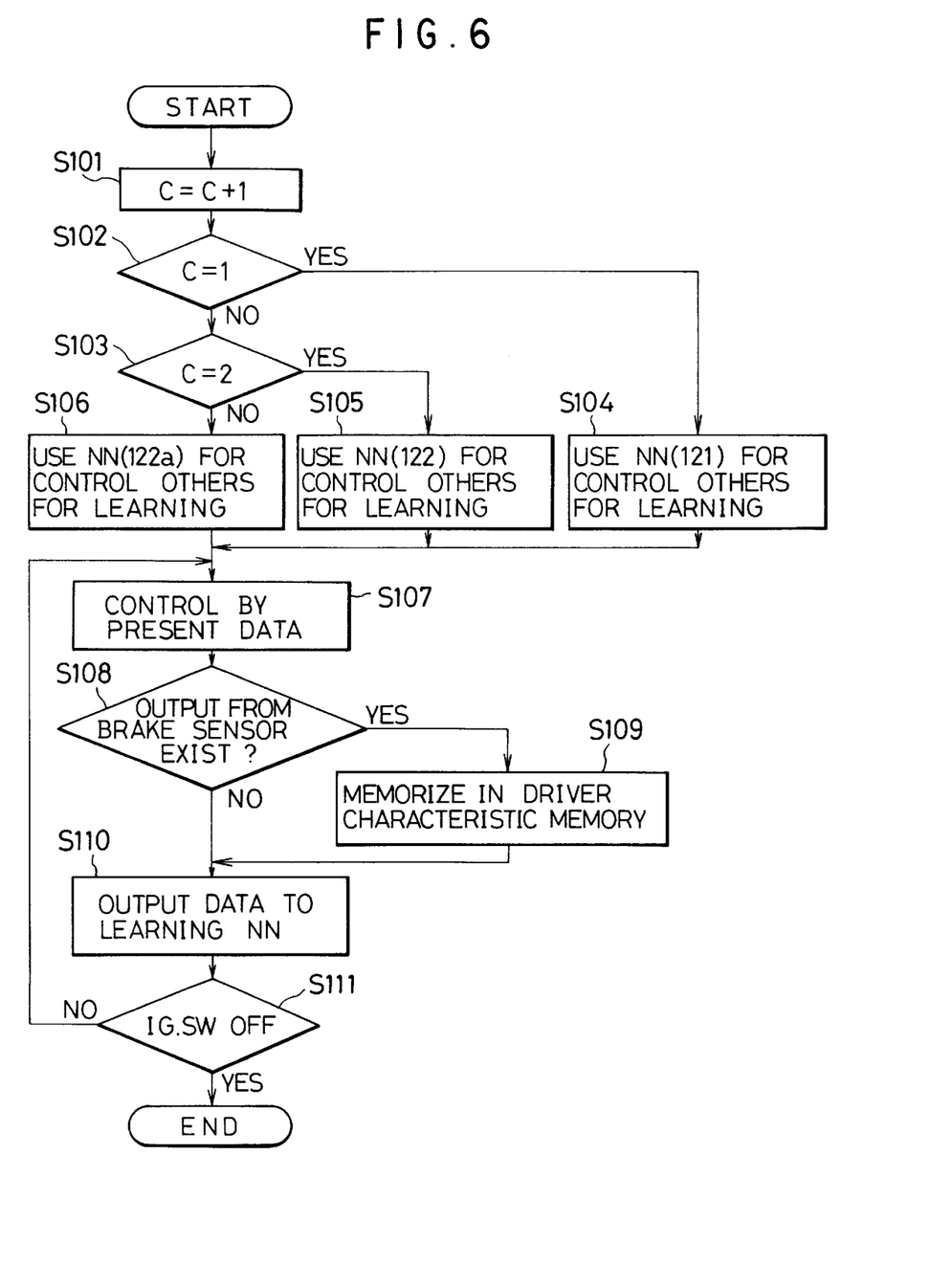
FIG. 6 is a flowchart of the control in an automatic brake control system according to the present invention.

Next, an operation of the vehicle equipped with thus constituted automatic brake control system will be described in reference to a flowchart in FIG. 6.

First, when a vehicle driver turns on the ignition switch 22 of the vehicle 1 to start the engine, the automatic brake control system including the automatic brake control unit 100 is started to operate. Each time the ignition switch 22 is turned on, the ternary counter is counted up by one (S101). It is judged whether the number counted is 1 (S102) or 2 or 0 (S103). If the counter value is 1, the neural network 121 is designated for the control use and the rest of the ones 122, 122a for the learning use (S104). On the other hand, if the counter value is 2, the neural network 122 is designated for the control use and the rest of the ones 121, 122a for the learning use (S105). If the counter value is 0, the neural network 122a is designated for the control use and the rest of the ones 121, 122 for the learning use (S106).

At the 0-mile stage of the vehicle 1, the automatic brake control unit 100 is reset and any of the neural networks 121, 122, 122a have learned the data stored in the base data memory 131b.

While the vehicle 1 is operated, the vehicle speed V and the vehicle-to-vehicle distance D are detected and the normalized vehicle-to-vehicle distance K is calculated by the calculating circuit 111, 112. Among these data, the vehicle speed V and the normalized vehicle-to-vehicle distance K are inputted through the input switching circuit 134a to the neural network 121 where an output S1 is calculated. The output S1 is an indicator indicating a degree of the driver's desire to apply brakes under the vehicle speed V and the normalized vehicle-to-vehicle distance K.

The output S1 calculated and updated is transmitted to the automatic brake 11 as a target brake control amount S through the switching circuits 124a and 135. When the automatic brake 11 receives the target brake control amount S, a deceleration value corresponding to the target brake control amount S is calculated in the calculation circuit of the automatic brake 11 and the driver circuit drives the brake actuator according to the deceleration value so as to produce a braking force corresponding to the target brake control amount S (S107).

When there is no vehicle ahead or when the vehicle-to-vehicle distance is large enough, the target brake control amount S calculated in the neural network 121 is zero and when the vehicle 1 comes close to the other vehicle running ahead, it becomes a large value. Further, the target brake control value S becomes large with an increase of the vehicle speed. When the driver brings the vehicle 1 too close to the vehicle running ahead and the target brake control amount S reaches a given value, a braking force corresponding to a degree of the access of the vehicle 1 to the vehicle running ahead is generated and applied to the vehicle 1 automatically so as to avoid collision with the vehicle running ahead.

On the other hand, in parallel with this, when a brake depression amount B is generated from the brake sensor 25 of the vehicle 1 (S108), the vehicle speed V, the normalized vehicle-to-vehicle distance K and the brake depression amount B are memorized to the driver characteristic memory 131a (S109). In response to the trigger signal T of the trigger detecting circuit 132, the learning control circuit 133a instructs the driver characteristic memory to raise a flag in the area where the set of these data V, K and B is memorized. When the driver finishes to depress the brake pedal, the neural networks 122, 122a conduct a series of learnings described next according to the control of the learning control circuit 133a (S110).

That is, a series of data V', K' and B' memorized during the brake operation are read out with the help of the above flag one by one from the driver characteristic memory 131a and are inputted to the neural networks 122, 122a through the distributor 134b, the input switching circuit 134a. In the neural networks 122, 122a, a "learning with teacher" is performed using these data according to the backpropagation method. Thus, the neural networks 122, 122a correct the degree of combination between neurons Wij so as to absorb the inherent brake depression characteristic of the driver.

Further, following this, the predetermined fixed data of the brake depression on a safety base, the series of data V", K" and B" are read out from the base data memory 131b one by one is inputted to the neural networks 122, 122a through the distributor 134b and the input switching circuit 134a. In the neural networks 122, 122a, a "learning with teacher" is performed using these data according to the backpropagation method.

As a result of these learnings of the data from the driver characteristic memory 131a and from the base data memory 131b, the learned data contain two characteristics originated from the driver's brake depression data and originated from the safety based data. Therefore, depending on the degree of safety of the base data, whether the learned data are set to a safety side or not is dependent on the degree of safety of the base data stored in the base data memory 131b.

In case of a driver who has a driving habit of not applying brakes until the vehicle comes very close to the vehicle running ahead, the automatic brake is operated so as to apply brakes sooner than the driver's judgement. Therefore, the learning based on actual braking operations is impossible. In such a case like this, the driver must turn the auto/manual switch 21 off to release the automatic brake control mode.

Once the automatic brake control mode is released, the target brake control amount S is stopped from being sent to the automatic brake 11 and as result the driver becomes able to apply brakes according to his or her own brake timing. In this state, since the automatic brake control unit 100 is operative except for the sending of the target brake control amount S, the learning of data in the neural networks 122, 122a still continues to run.

Therefore, even after the automatic brake control mode is released, when the driver finishes to depress the brake pedal, the neural networks 122, 122a conduct a series of learning based on the driver's actual braking operation. Thus, also in case of a driver who has a driving habit of late braking, the brake depression characteristic of the driver's own can be absorbed in the neural networks 122, 122a.

Thus, when the driver turns the ignition switch 22 off (S111), the driver's personal characteristic for the braking operation, namely, the driver's inherent characteristics such as the timing of starting the brake depression, the speed of the brake depression and the timing of ending the brake depression are absorbed in the neural networks 122, 122a.

When the same driver drives the same vehicle 1 again and turns the ignition switch 22 on and when the auto/manual switch is set to the automatic control mode, the neural network 122 is selected for the control use this time and the rest ones 121, 122a are selected for the learning use. Since the automatic brake control of this time is conducted by an output S2 from the neural network 122 which has learned the driver's characteristic at the previous driving, the brakes of the vehicle 1 according to the automatic control system of this time have less awkwardness than the previous ones. The output S2 is a result of calculation in the neural network 122 based on the vehicle speed V, the normalized vehicle-to-vehicle distance K and the data from the distributor circuit 134b.

Each time the driver drives the vehicle 1 and operates the ignition switch 22, the neural network for the control use is changed, for example from the neural network 122a to the neural network 121 and then from the neural network 121 to the neural network 122 etc. and at each time of changing the neural network a degree of learning is increased. As the neural networks are educated, the brake characteristic of the automatic brake control system comes closer and closer to the driver's characteristic.

In summary, according to the present invention, applying the neural network to the automatic brake control enables the automatic brake control to have a nonlinear characteristic close to human sensitivity, whereby a much finer control than prior automatic brake control systems can be realized in the automatic brake control system. Further, employing a plurality of neural networks enables the automatic brake control system to perform both controlling and learning in parallel, whereby the processing speed of the brake control can be improved largely.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An automatic brake control system of a vehicle having an engine, a foot brake pedal and an ignition switch, the system including a vehicle speed sensor for detecting a vehicle speed, a vehicle-to-vehicle distance detecting device for detecting an actual distance between said vehicle and another vehicle running ahead of said vehicle, a brake sensor for sensing a depression amount of said foot brake pedal and an automatic brake apparatus for automatically applying brakes to said vehicle, comprising:

reference vehicle-to-vehicle distance calculating means for calculating a reference distance between said vehicle and said other vehicle according to a formula parameterizing at least said vehicle speed;

normalized vehicle-to-vehicle distance calculating means for calculating a normalized distance between said vehicle and said other vehicle according to a normalization formula parameterizing a ratio of said actual distance and said reference distance; and target brake control amount calculating means including at least one neural network for calculating a target brake control amount based on at least said vehicle speed and said normalized vehicle-to-vehicle distance and outputting said target brake control amount to said automatic brake apparatus.

2. The automatic brake control system according to claim 1, wherein an auto/manual switch is provided for stopping outputting said target brake control amount to said automatic brake apparatus.

3. An automatic brake control system of a vehicle having an engine, a foot brake pedal and an ignition switch, the system including a vehicle speed sensor for detecting a vehicle speed, a vehicle-to-vehicle distance detecting device for detecting an actual distance between said vehicle and another vehicle running ahead of said vehicle, a brake sensor for sensing a depression amount of said foot brake and an automatic brake apparatus for automatically applying brakes to said vehicle, comprising:

reference vehicle-to-vehicle distance calculating means for calculating a reference distance between said vehicle and said other vehicle according to a formula parameterizing at least said vehicle speed;

normalized vehicle-to-vehicle distance calculating means for calculating a normalized distance between said vehicle and said other vehicle according to a normalization formula parameterizing a ratio of said actual distance and said reference distance;

first memory means for memorizing a driver's data including at least said vehicle speed, said normalized distance between said vehicle and said other vehicle and said depression amount at least while said foot brake pedal is depressed by a driver during a normal operation of said vehicle;

second memory means for memorizing a standard data including at least said vehicle speed, said normalized distance between said vehicle and said other vehicle and said depression amount;

output controlling means for outputting said driver's data and said standard data when said driver finishes depressing said brake pedal;

selecting signal generating means for generating a selection signal when said ignition switch is turned on;

neural network selecting means responsive to said selection signal for selecting at least one neural network for control use and for selecting at least one rest neural network for learning use;

controlling and learning means with respect to said neural network selected for learning use for learning said driver's data and said standard data based on said vehicle speed and said normalized distance between said vehicle and said other vehicle and for producing a learned data, and concurrently with respect to said neural network selected for control use for calculating and selectively outputting a target brake control amount based on said vehicle speed and said normalized distance between said vehicle and said other vehicle with reference to said learned data; and output switching means responsive to said selection signal for selecting said target brake control amount calculated in said neural network selected for control use and for outputting said target brake control amount to said automatic brake apparatus.

4. The automatic brake control system according to claim 3, wherein an auto/manual switch is provided for stopping outputting said target brake control amount to said automatic brake apparatus.

5. The automatic brake control system according to claim 3, wherein said selecting signal generating means comprise a counter value generating circuit from which a counter value corresponding to each of said neural networks is generated each time said ignition switch is turned on.

6. An automatic brake control method of a vehicle having an engine, a foot brake pedal and an ignition switch, the system including a vehicle speed sensor for detecting a vehicle speed, a vehicle-to-vehicle distance detecting device for detecting an actual distance between said vehicle and another vehicle running ahead of said vehicle, a brake sensor for sensing a depression amount of said foot brake pedal and an automatic brake apparatus for automatically applying brakes to said vehicle, comprising the steps of:

calculating a reference distance between said vehicle and said other vehicle according to a formula parameterizing at least said vehicle speed;

calculating a normalized distance between said vehicle and said other vehicle according to a normalization formula parameterizing a ratio of said actual distance and said reference distance; and calculating and outputting a target brake control amount based on at least said vehicle speed and said actual distance between said vehicle and said other vehicle.

7. An automatic brake control method of a vehicle having an engine, a foot brake pedal and an ignition switch, the system including a vehicle speed sensor for detecting a vehicle speed, a vehicle-to-vehicle distance detecting device for detecting an actual distance between said vehicle and another vehicle running ahead of said vehicle, a brake sensor for sensing a depression amount of said foot brake and an automatic brake apparatus for automatically applying brakes to said vehicle, comprising the steps of:

calculating a reference distance between said vehicle and said other vehicle according to a formula parameterizing at least said vehicle speed;

calculating a normalized distance between said vehicle and said other vehicle according to a normalization formula parameterizing a ratio of said actual distance and said reference distance;

memorizing a driver's data including at least said vehicle speed, said normalized distance between said vehicle and said other vehicle and said depression amount at least while said foot brake pedal is depressed by a driver during a normal operation of said vehicle;

memorizing a standard data including at least said vehicle speed, said normalized distance between said vehicle and said other vehicle and said depression amount;

outputting said driver's data and said standard data when said driver finishes pressing said brake pedal;

generating a selection signal when said ignition switch is turned on;

responsive to said selection signal selecting at least one neural network as a control use and selecting at least one rest neural network as a learning use;

with respect to said neural network selected for learning use, learning said driver's data and said standard data based on said vehicle speed and said normalized distance between said vehicle and said other vehicle and producing a learned data, and with respect to said neural network selected for control use, calculating and selectively outputting a target brake control amount based on said vehicle speed and said normalized distance between said vehicle and said other vehicle with reference to said learned data; and selecting said target brake control amount calculated by said neural network selected for control use and outputting said target brake control amount to said automatic brake apparatus.

8. An automatic brake control system for automatically braking a driving vehicle according to a distance between said driving vehicle and a vehicle ahead of said driving vehicle, comprising:

vehicle speed detecting means for detecting a vehicle speed of said driving vehicle;

actual distance detecting means for detecting an actual distance between said driving vehicle and said vehicle ahead of said driving vehicle;

reference distance calculating means for calculating a reference distance defined as a physically preferable distance between said driving vehicle and said vehicle ahead of said driving vehicle according to at least said vehicle speed;

normalized distance calculating means for normalizing said actual distance with said reference distance to obtain a normalized distance in a dimensionless quantity;

target brake control amount calculating means including at least one neural network for calculating a target brake control amount according to said vehicle speed and said normalized distance; and automatic braking means for automatically braking said driving vehicle according to said target brake control amount.

9. An automatic brake control system for automatically braking a driving vehicle according to a distance between said driving vehicle and a vehicle ahead of said driving vehicle, comprising:

vehicle speed detecting means for detecting a vehicle speed of said driving vehicle;

actual distance detecting means for detecting an actual distance between said driving vehicle and said vehicle ahead of said driving vehicle;

reference distance calculating means for calculating a reference distance defined as a physically preferable distance between said driving vehicle and said vehicle ahead of said driving vehicle according to at least said vehicle speed;

normalized distance calculating means for normalizing said actual distance with said reference distance to obtain a normalized distance in a dimensionless quantity;

target brake control amount calculating means including a plurality of neural networks being alternatively switched between control use and learning use wherein one of said neural networks is in control use to calculate a target brake control amount according to said vehicle speed and said normalized distance while other of said plurality of neural networks is in learning use for learning a tendency of driving; and automatic braking means for automatically braking said driving vehicle according to said target brake control amount.

10. The automatic brake control system according to claim 9, wherein said plurality of neural networks are alternatively switched in accordance with a number of turning-on of an ignition switch.

11. The automatic brake control system according to claim 9, further comprising a memory for memorizing driving data of the vehicle speed and the normalized distance at a braking operation by a driver in order to provide said driving data for the learning use.

12. The automatic brake control system according to claim 9, further comprising:

a first memory for memorizing driving data of said vehicle speed and said normalized distance at a braking operation by a driver in order to provide said driving data for said learning use; and a second memory for memorizing standard data of said vehicle speed and said normalized distance in order to relieve a property of said neural network when said property of said neural network is accidentally changed.

13. The automatic brake control system according to claim 9, further comprising a switch used to stop the operation of said automatic braking means in order to advance said learning in said neural network for said learning use.

* * * * *